Figure 1:
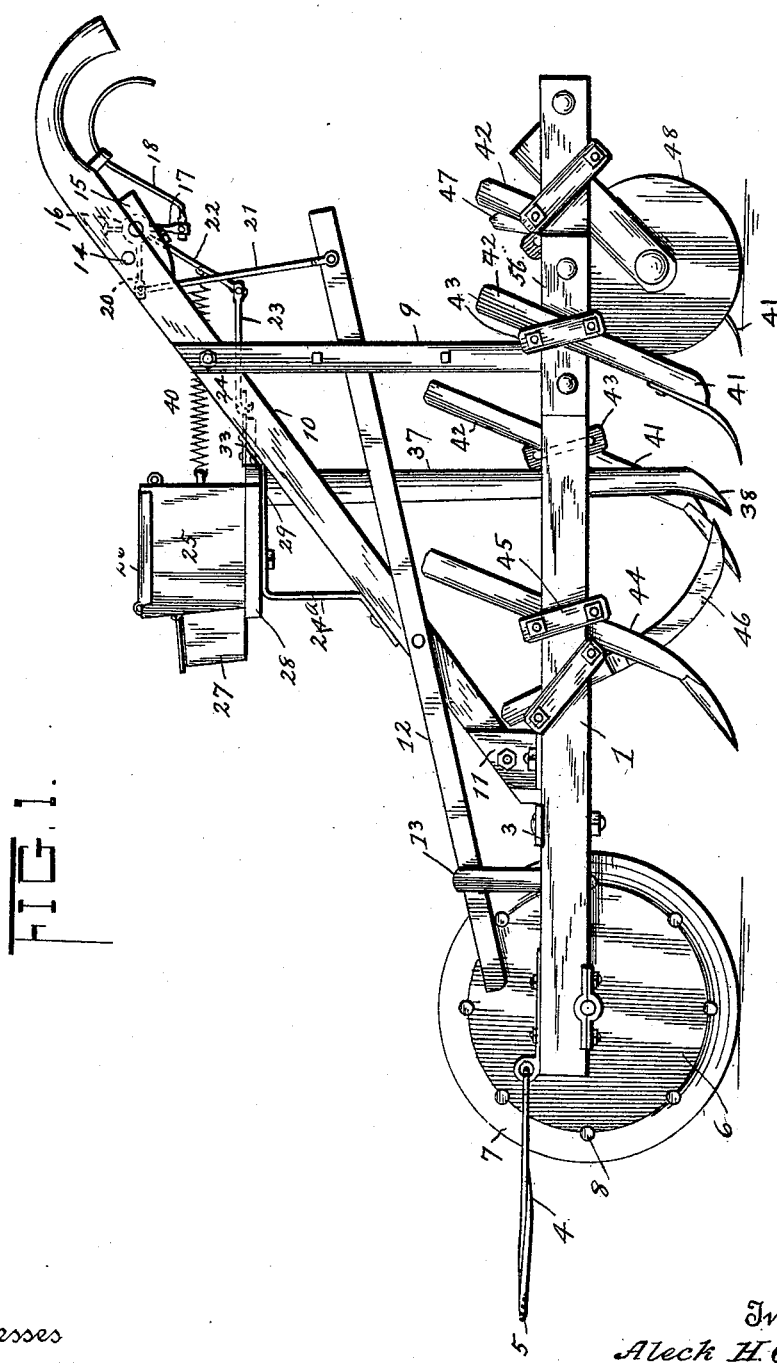

No. 607,364. Patented July 12, 1898.
A. H. GREEN.
COMBINED CULTIVATOR AND PLANTER.
(Application filed Apr. 4, 1898.)

(No Model.) 3 Sheets—Sheet 1.

Witnesses
Sam'l R. Turner
Chas. S. Hyer.

Inventor
Aleck H. Green.
By R.H.&B. Lacey,
his Attorneys.

No. 607,364. Patented July 12, 1898.
A. H. GREEN.
COMBINED CULTIVATOR AND PLANTER.
(Application filed Apr. 4, 1898.)
(No Model.) 3 Sheets—Sheet 2.
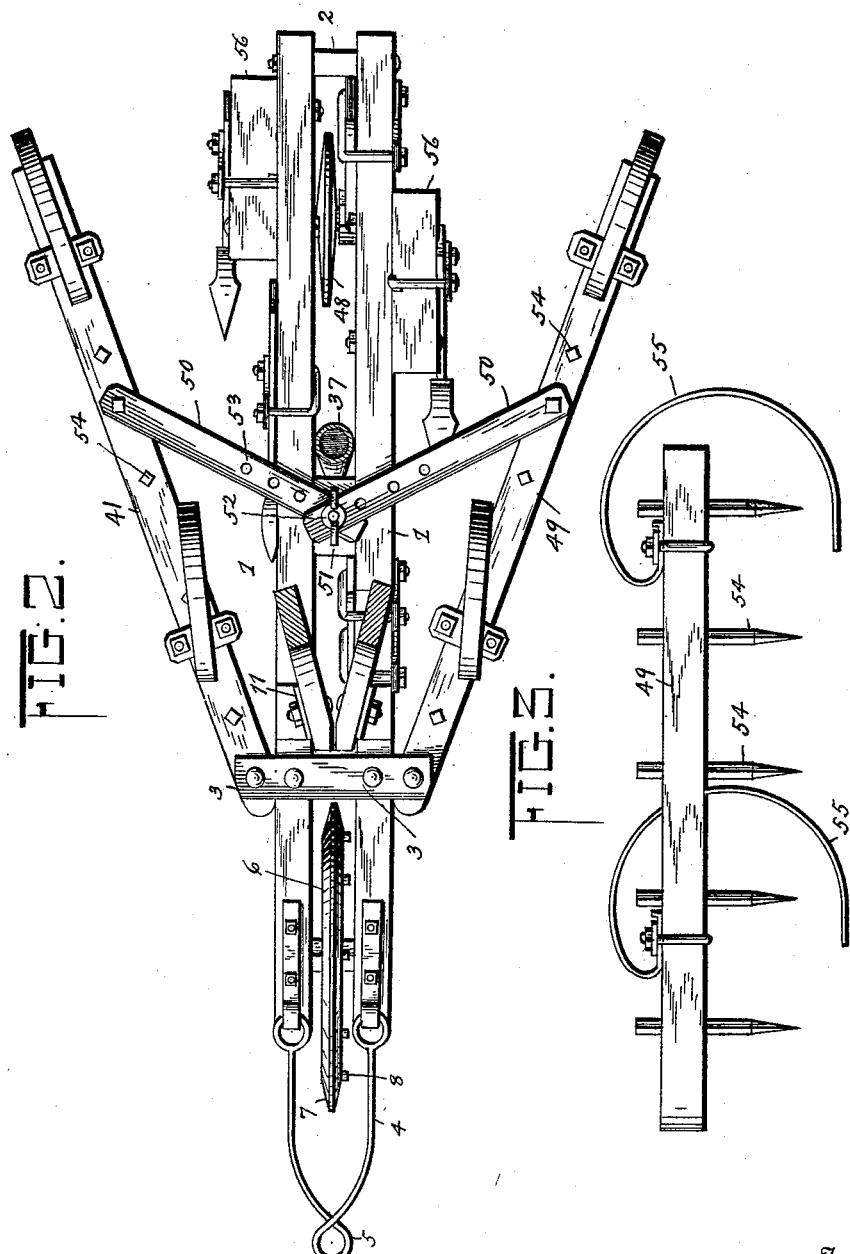
Witnesses
Inventor
Aleck H. Green.

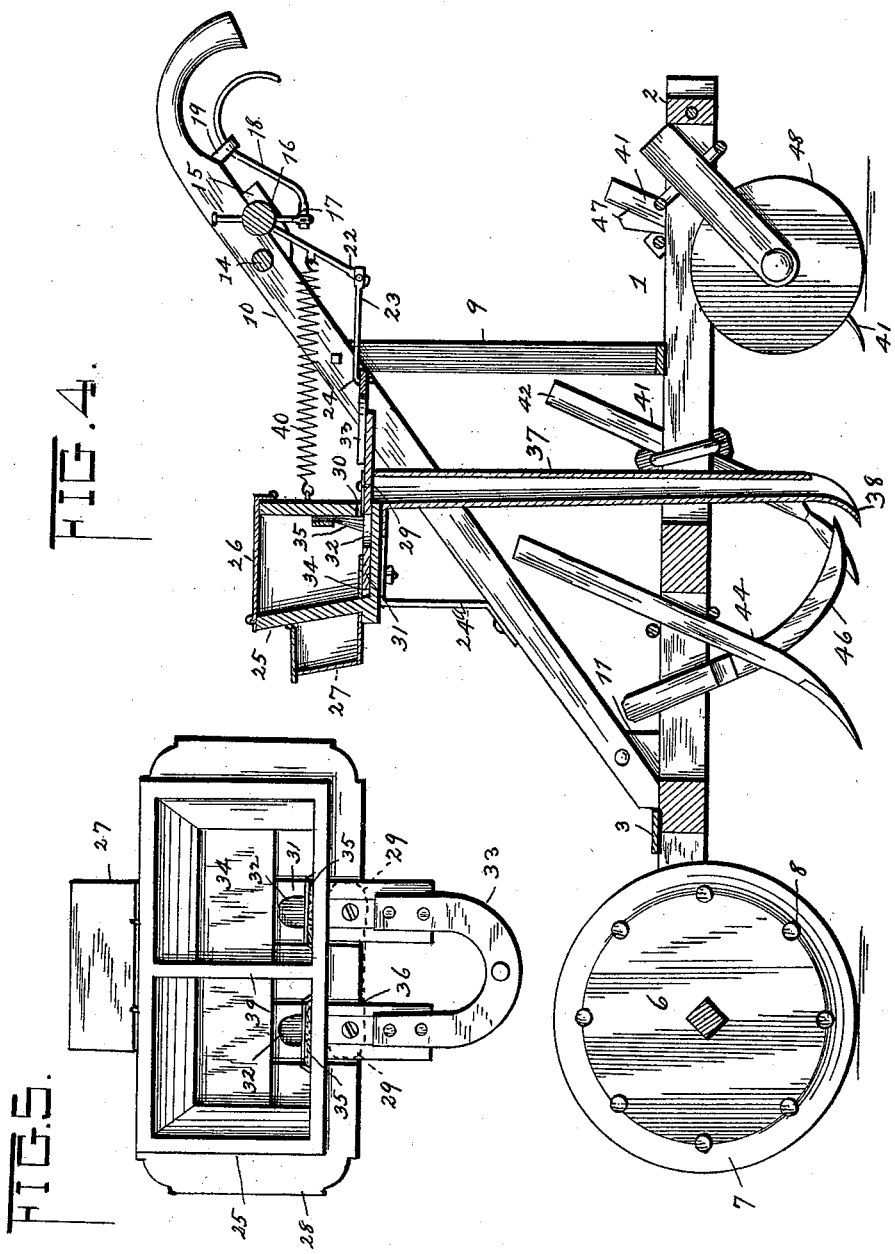

UNITED STATES PATENT OFFICE.

ALECK H. GREEN, OF OWENSBOROUGH, KENTUCKY.

COMBINED CULTIVATOR AND PLANTER.

SPECIFICATION forming part of Letters Patent No. 607,364, dated July 12, 1898.

Application filed April 4, 1898. Serial No. 676,404. (No model.)

*To all whom it may concern:*

Be it known that I, ALECK H. GREEN, a citizen of the United States, residing at Owensborough, in the county of Daviess and State of Kentucky, have invented certain new and useful Improvements in a Combined Cultivator and Planter; and I do hereby declare the following to be a full, clear, and exact description of the invention, such as will enable others skilled in the art to which it appertains to make and use the same.

This invention relates to a combined cultivator and planter; and it consists, essentially, of a pair of longitudinally-disposed central beams spaced apart from each other and having at the front, between them, an operating ground-wheel provided with jog-pins or projections on one side and also with a rear adjusting-wheel and handles supporting an elevated trough or seedbox, with a feed-slide therein actuated by a reciprocating lever engaging the said jog-pins and from which depends a feed-spout or dropping-tube, the said beams also having means for adjustably connecting laterally-projecting supplemental harrow-beams, and, further, with means for securing single or double shovel or other plows in proper relative position, as well as incidental cultivating devices.

The invention further consists of the details of construction, arrangement, and combination of the several parts, which will be more fully hereinafter described and claimed.

The object of the invention is to provide a combined agricultural machine convertible into different forms and adaptable for various uses by supplementing or substituting different parts and having also general removable members to facilitate changes of the device from a cultivator, harrow, and seeder alone, to arrange the entire machine for one of said purposes or combine two or more of the same, and thereby expedite cultivation of the ground and planting and reduce the expense by having one machine primarily embodying the several features set forth.

In the accompanying drawings, Figure 1 is a side elevation of the improved machine or device arranged as a combined seeder or planter and cultivator. Fig. 2 is a top plan view of the improved device, partially broken away or cut through horizontally above a certain point and illustrating supplemental harrow-beams applied in position thereon. Fig. 3 is a side elevation of one of the supplemental harrow-beams. Fig. 4 is a longitudinal vertical section of the improved device. Fig. 5 is a detail top plan view of the seedbox, showing the lid or cover removed.

Referring to the drawings, wherein similar numerals of reference are employed to indicate corresponding parts in the several views, the numeral 1 designates a pair of longitudinally-disposed central beams held apart from each other to provide a central space between them and immovably held in such position by a space-block 2 at the rear and cross brace-bars 3 near the front and also by the arrangement of the several parts which will be more fully hereinafter set forth. To the front ends of the said beams a draft-loop or analogous device 4 is movably attached, which is elongated and has an eye 5 at its front end for engagement with draft devices of any suitable nature. Between the front portions of the said beams 1 an operating ground-wheel 6 is rotatably mounted, and adjacent its periphery is beveled, as at 7, on opposite sides to reduce the tractive surface thereof and induce a firm engagement or slight depression into the ground to prevent sliding or slipping and assist in keeping the entire machine in the direction of movement desired. From one side of the said wheel 6 jog-pins or projections 8 extend outwardly and, as shown, are circularly arranged at the inner termination of the bevel 7 on that side of the wheel. Nearer the rear ends of the said beams 1 are uprights 9, which are connected at the bottom to each other and at their upper ends are attached to inclined handles 10, the latter having their lower ends firmly held down on the front part of the said beams 1 by angle-irons 11, bolted thereto and to the said beams. To one of these said handle-bars 10 a reciprocating lever 12 is pivotally attached, and the front end thereof is held in engagement with the jog-pins 8 on the wheel 6, a vertical yielding arm 13, secured to one of the beams 1, holding the said lever in engagement with the jog-pins and preventing lateral displacement of the said lever owing to wear and strain on the pivot or fulcrum thereof. The handle-bars 10 are connected by a cross-round or analogous device 14, and in rear of the latter and mounted in suitable journal-blocks 15, attached to the lower upper portions of the said handle-bars, a rock-shaft 16 is located, and has an arm or pin 17 connected thereto, to the lower end of which is movably secured the front end of a handle or grip 18, having a rear curved end and adapted to be removably placed in the hook 19 on one of the said handle-bars. Another crank arm or pin 20 projects from the forward portion of the said rock-shaft 16, and movably secured thereto is the upper end of a link 21, having its lower end pivotally attached to the rear portion of the lever 12. An elongated slide-actuating rod 22 also projects downwardly and forwardly from the rock-shaft 16 and is connected to the rear end of a horizontal link 23, having a hook 24 at the opposite end.

By means of suitable angle-supports 24ª, resting on and secured to the handle-bars 10, a feed-trough or seedbox 25 is held in an elevated position and provided with a hinged lid or cover 26 and at the front with a tool-box 27, being separate from the trough or seedbox and serving to receive such tools or implements as are necessary to be employed in attaching or detaching any of the parts of the device in making a change for different uses. The bottom 28 of the trough or box 25 projects slightly to form a surrounding ledge and at the rear is horizontally slotted, as at 29, (see Fig. 5,) in line with slots or openings 30 in the rear wall of the said trough or box 25. Movably mounted in the said slots 29 and through the openings 30 are opposite slides 31, having elongated or oval openings 32 therein, which form, with the bottom of the box, a receiving-pocket, and both slides are connected at the rear for simultaneous and uniform operation by a U-shaped connecting plate or strap 33, to which the front hooked end 24 of the horizontal link 23 is movably secured. At a slight elevation above the bottom of the trough or box and in the front part thereof is a shield-plate 34, under which the front ends of the slides 31 have movement, and directly opposite brushes 35 are secured and long enough to bear with sufficient friction or pressure on the upper surfaces of the slides and located directly over the openings or slots 30. The slots 29 in the rear ledge of the bottom of the trough or seedbox open into the upper enlarged end 36 (clearly shown in dotted lines in Fig. 5) of a spout or dropping-tube 37, which depends through the space between the beams 1 a required distance below the latter and having a bottom reduced or penetrating end 38. Below the upper enlarged portion 36 the said spout or dropping-tube is gradually reduced until an average-sized orifice of the character is provided, and the function of this arrangement is to have both slides deposit the material drawn outward from the seedbox simultaneously in the upper enlarged end of the said tube for evident and well-known purposes. The trough or seedbox 25 is centrally divided by a transverse partition 39, thereby forming two compartments, one of which may be used for containing seed and the other fertilizer, and it will be observed that the slides operate in the compartments. To return the slides to their normal position within the seedbox, as shown in Fig. 4, a spring 40 is connected to the rear of the trough or box 25 and also to the slide-operating bar or rod 22, extending from the rock-shaft, and the said slides are thrown forwardly or in a direction reverse to the movement of said parts by the lever 12.

When the trough or seedbox 25 has been supplied with seed and fertilizer and the machine set in motion by suitable draft-animals, the lever 12 is reciprocated by the jog-pins 8 on the ground-wheel 6 and the rock-shaft 16 oscillated, and thereby actuates the slide-operating bar or rod 22, which, drawing on the horizontal link 23, uniformly withdraws the slides 31, and the seed or fertilizer which settles in the elongated or oval openings 32 is thrown outwardly into the upper enlarged end 36 of the spout or dropping-tube 37. The seed or fertilizer is directed into the openings 32 by the shield 34, which has a similar position in both compartments of the trough or box, and as the slides 31 are moved outwardly from the said trough or box the brushes 35 remove the surplus material from the top portions of the slides, and a regular feed of both seed and fertilizer in predetermined quantities into the spout or tube 37 is accomplished. At different times it may be found necessary to skip certain portions of the ground in the operation of seeding or planting, and particularly in turning the machine, and it will not be desired to have the slides 31 operated. To attain this result, the supplemental handle 18 is drawn rearwardly and held in this position, thus retaining the said slides in their outward position and at the same time depressing the rear end of the lever 12 through the link 21 and its connection with the rock-shaft 16 to thereby throw the forward end of said lever upward from engaging position or out of the plane of rotation of the jog-pins 8. This capability of the machine is also useful for replanting purposes, and, if desired, the supplemental handle 18 might at any time be temporarily secured to the near portion of one of the handle-bars 10, it being seen that the said supplemental handle is always in convenient position for operation by engagement with the hook 19. In the outward movement of the slides 31 from the trough or seedbox their front ends never entirely clear the rear edges of the shield 34, and the material contained within the trough or box is thereby prevented from entering the space between the shield and the bottom of the said trough or box.

Along the outer sides of the beams 1 at regular intervals cultivator-blades 41 are adjustably mounted at an angle and have the standards 42 thereof held against said beam by stirrups. Also in advance of the said spout or tube and similarly attached to one of the beams 1 is a fender or reverse cultivator 46 to clear or hold the furrow open in advance of the lower end of said spout or tube after the furrow-wheel has completed its work. This fender may be constructed in different forms and broadened or reduced, as shown, and to sustain the angle of adjustment in connection with the several stirrups keys 47 are employed to hold the posts of the blades at a proper angle. These blades can be either of single or double shovel form, or any other kind of plow can be equally well used and in accordance with the work to be performed. To regulate the depth of penetration of the several blades after their primary adjustment, a trailing wheel 48 is adjustably mounted in the rear part of the beams 1, and from the construction of the device as thus far disclosed it will be observed that it can be employed to serve the purpose of a combined seeder and planter and cultivator, or either one of these functions alone can be attained.

To adapt the device for use as a harrow, supplemental beams 49 are pivotally mounted at their front ends in the projecting portions of the cross-braces 3 and are held in a predetermined adjusted position by link-plates 50, attached thereto and extending inwardly over the central block 51 and held against movement by a bolt and nut 52. The link-plates 50 may be provided with a series of apertures 53, as shown in Fig. 2, to regulate the lateral extent of the said supplemental beams 41 from the said beams 1, and said supplemental beams have therein at regular intervals straight harrow-teeth 54, or, if desired, and as shown in Fig. 3, spring harrow-teeth 55 can be clamped at regular intervals on the said harrow-beams. The beams 1 could also be provided with openings for receiving straight harrow-teeth and the whole device be used very conveniently as a harrow alone, or spring harrow-teeth similar to those shown in Fig. 3 could be held in place on the beams 1 at regular intervals by the upper portions of the stirrups 43.

The machine as an entirety is capable of having applied thereto or detached therefrom any one or more of the devices mentioned for separate or combined usage, and it will be understood also that attachments well known in the art and applicable to the present construction will be employed wherever found necessary. Furthermore, the cultivator-blades are intended to be alternately arranged or staggered, and for supporting the rearmost blades, as clearly shown in Fig. 2, blocks 56 are secured to the outer sides of the beams 1. Furthermore, such braces and strengthening devices as will be necessary will be used at all required points, and it is obviously apparent that changes in the proportions, dimensions, and minor details of construction might be resorted to and substituted for those shown without in the least departing from the spirit of the invention or sacrificing any of the advantages thereof.

Having thus described the invention, what is claimed as new is—

1. In a device of the character set forth, the combination of a pair of longitudinally-disposed central beams adapted to support cultivating-blades, a ground-wheel rotatably mounted in the front portion of said beams and having jog-pins or projections on one side thereof, a pair of handles rising from said beams supporting an elevated trough or seedbox having a dividing-partition and independent slides in the bottom, a rock-shaft having bearing in said handles in rear of said seedbox, a U-shaped connecting plate or strap having its free ends attached to the opposite slides, a horizontal link movably connected to the central portion of said U-shaped connecting plate or strap, an elongated slide-actuating rod attached to the rear end of said horizontal link and also connected to the rock-shaft, a handle or grip loosely connected to the rock-shaft, a hook on one of the handle-bars adapted to be engaged by said handle or grip, a spring connected to the elongated slide-actuating rod and also to the seedbox or trough, a depending spout or dropping-tube having an upper enlarged end over which the slides work, and a reciprocating lever having its rear end attached to the rock-shaft and the front end loosely engaging the jog-pins or projections on the ground-wheel.

2. In a device of the character set forth, the combination of central beams adapted to have cultivator-blades attached thereto, supplemental beams movably connected to the outer sides of the said central beams and having harrow-teeth therein, a ground-wheel mounted in the front portion of the central beams and provided with jog-pins or projections on one side, a pair of handle-bars rising from the central beams, a seedbox supported by the said handle-bars and having a divided partition and horizontal slides therein with openings therethrough, brushes located above and bearing upon the said slides, a U-shaped plate having its free ends attached to the opposite slides, a depending spout or tube having an upper enlarged end over which both slides have movement, a rock-shaft supported by the handle-bars in rear of the seedbox, a horizontal link having its front end engaging the central rear portion of the U-shaped plate, an elongated slide-actuating rod attached to the rear end of said link and to the rock-shaft, a spring connected to said slide-actuating rod and the seedbox, a reciprocating lever fulcrumed on one of the handle-bars and having its front end loosely engaging the jog-pins or projections on the ground-wheel and its rear end movably attached to the rock-shaft, a vertical yielding arm engaging the front part of said lever to hold it in engagement with the jog-pins or projections on the ground-wheel, a supplemental handle attached to the rock-shaft for throwing the slides temporarily out of operation, and a trailing wheel between the rear portions of the central beams.

In testimony whereof I affix my signature in presence of two witnesses.

ALECK H. GREEN.

Witnesses:
 J. W. RUSSELL,
 C. C. STUART.